June 24, 1958     R. H. PRICE     2,840,339
DIAPHRAGM VALVES AND DIAPHRAGMS THEREFOR Filed May 12, 1954     2 Sheets-Sheet 1

INVENTOR
Richard Hector Price
BY
ATTORNEY

June 24, 1958 R. H. PRICE 2,840,339
DIAPHRAGM VALVES AND DIAPHRAGMS THEREFOR
Filed May 12, 1954 2 Sheets-Sheet 2

INVENTOR
Richard Hector Price
BY
ATTORNEY

United States Patent Office 2,840,339
Patented June 24, 1958

2,840,339

DIAPHRAGM VALVES AND DIAPHRAGMS THEREFOR

Richard Hector Price, Cwmbran, Newport, England, assignor to Saunders Valve Company Limited, Cwmbran, Newport, England, a British company Application May 12, 1954, Serial No. 429,327

Claims priority, application Great Britain May 13, 1953

2 Claims. (Cl. 251—331)

This invention relates to diaphragm valves in which the diaphragm is made in a form corresponding to the closed position and in this position takes a more or less conical form rounded at the apex and which in being moved to the open position is, so to speak, turned inside out. One valve of this character is that disclosed in application Serial Number 108,676, filed August 5, 1949, now matured into Patent Number 2,705,124.

In a practical valve, the diaphragm has to be of fairly stout rubber or rubber-like material with fabric reinforcement and a considerable effort is required to turn the diaphragm inside out, which puts a substantial load on the attachment of the stud through which the necessary pull is transmitted to the diaphragm.

An object of the present invention is to reduce the effort necessary to turn the diaphragm inside out. This not only reduces the load on the stud attachment, thus reducing the risk of the stud being pulled out of the diaphragm, but it also lessens the effort which the operator has to make in opening the valve.

According to the present invention, a diaphragm for a valve of the kind in question is characterized by an axial section such that when the diaphragm is free, part or all of the clamped margin continues the slope (but usually less steeply) of the side of the cone. Thus the clamped margin, when free, is not of the same form as the clamping surfaces, i. e. usually flat, but slopes from the extreme margin towards the apex of the cone, and when the margin is clamped, this sloping part of the margin is put in tension on the side away from the valve bore and in compression on the side towards the valve bore.

Desirably this slope takes the form of a sweeping curve right from the edge of the diaphragm into the conical side. In the case of a diaphragm of the proportions and form shown in Patent No. 2,705,124 the curvature on the bore side may be a circular arc of radius about two-thirds of the radius of the base of the cone.

Figure 1:
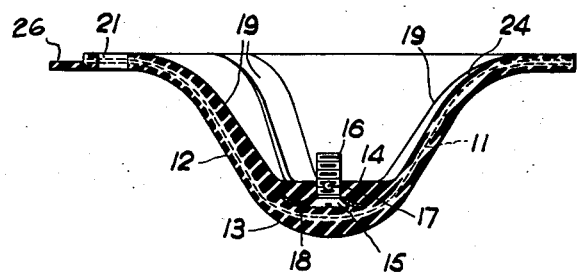
Figure 2:
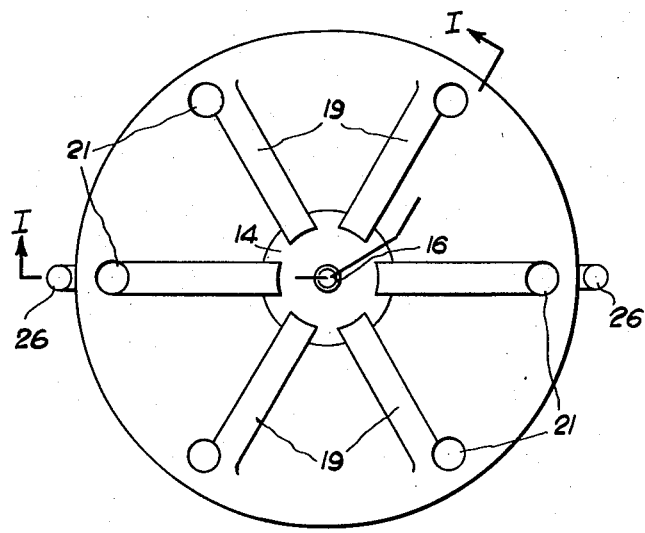
Figure 3:
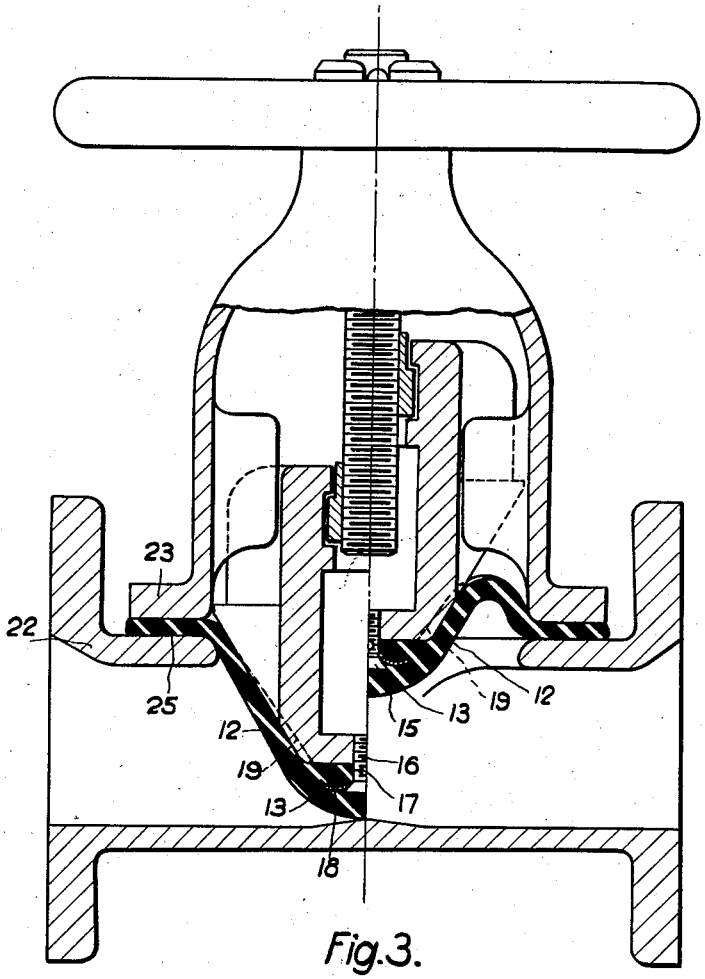
Figure 4:
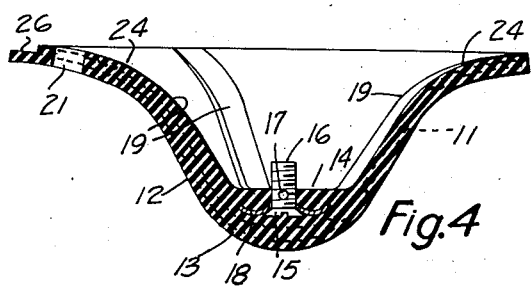

In the accompanying drawings Figure 1 is a section on the line I—I of Figure 2, showing a typical diaphragm according to the present invention in the free position and of the proportions which might be used in a valve of 3" bore or larger. Figure 2 is a plan view of Figure 1 and Figure 3 is a longitudinal section of a valve with the improved diaphragm of Figures 1 and 2 in place, the left-hand side of the figure showing the valve closed and the right-hand side the valve partly open. Figure 4 is a section similar to Figure 1 of a slightly different form of diaphragm according to the present invention.

As shown in Figures 1 and 2 and in Figure 4 the diaphragm which is moulded of vulcanized India-rubber or of a synthetic rubber-like material according to the fluid to be controlled and provided with fabric reinforcement indicated at 11, has a conical portion 12 terminating at the centre in a rounded-off contour 13 short of the apex of the cone. As explained in the said Patent No. 2,705,124. this rounded contour matches the cross-section of the lower part of the valve bore. It will be seen that as explained in the said Patent No. 2,705,124, the valve body has a bore therethrough of substantially constant cross section throughout at least a substantial part of the bore and that a seating is formed therein comprising a first seating section formed by an arcuate peripheral bore surface portion at one side of said bore part, being the lower part of the valve bore above mentioned and that the body is formed with an enlargement having a lateral opening opposing said first seating section, the enlargement including a second seating section formed by a surface tapering inwardly from the lateral opening towards the first seating section and at the ends of the first seating section merging substantially tangentially therewith. The valve further includes a bonnet over the lateral opening and secured to the body. The diaphragm is shaped to co-operate with the two said seating sections. On the back of the diaphragm the centre part is bounded by a transverse flat surface 14. The mass of material thus formed at the centre prevents any substantial flexing of this part of the diaphragm during the opening and closing of the valve and also provides material for the embedding of the head 15 of a screwed stud 16 by which attachment to the diaphragm is made. To strengthen the anchoring of the stud, it may be provided with a cross-pin 17 in a position to be embedded and a loose washer 18 of curved cross section may also be embedded resting against the head of the stud. It would also be possible to carry the reinforcement into engagement with the stud in the manner in itself known.

The back of the diaphragm may be provided with radial ribs 19, say six in number, which serve to strengthen it without substantially affecting its flexibility. These may have maximum height at the centre and run out to nothing approximately at the location of the holes 21 through which pass the clamping bolts which draw together the parts of the valve, namely, the body 22 and bonnet 23 in Figure 3, between which the diaphragm is clamped. Instead of or in addition to the ribs, the diaphragm itself may taper in section towards the margin. The diaphragm has two tabs 26 which may bear symbols indicating the material of which it is made and also serving to assist in locating the diaphragm when it is being assembled in the valve.

The present invention provides a sweeping curve 24 extending from the conical portion 12 towards the edge of the diaphragm. This curve may as shown be a circular arc the radius of which on the bore side is about two-thirds of the radius of the base of the cone and extends right to the edge as shown in Figure 4, or it might run out a little within the edge, the remainder of the margin being flat and transverse to the axis of the diaphragm as shown in Figure 1. In any case as comparison with Figure 3 will show, the curve is such that it terminates well beyond the inner edge or limit of the flat clamping surface 25 on the valve body 22 so that the mere act of clamping the free diaphragm involves substantial deformation which puts the upper layers of the diaphragm margin in tension and the under layers in compression.

As will be appreciated from Figures 1 and 4 the free position of the diaphragm i. e. the form in which it is moulded, is that corresponding to the closed position of the valve shown on the left-hand side of Figure 3 and it is in the closed position of the valve that the above mentioned stress distribution is obtained. Accordingly this portion of the marginal part of the diaphragm, including the portion radially within the clamped margin, will be under a stress urging it to bend upwardly, and during the opening of the valve this stress assists the opening movement and correspondingly reduces the effort which has to be exerted by the operator.

It has been found that by changing the shape of the diaphragm in this way but not making any other changes in its dimensions or material, the effort required to turn the diaphragm inside out is very substantially reduced. For instance, in the case of a valve of 2" or 3" bore the effort is reduced by about half.

To ensure the best flow conditions the diaphragm should be inverted from the periphery inwards when the valve is open, so that as shown on the right-hand side of Figure 3, the diaphragm is upwardly convex just within the clamped margin. The aforesaid ribs 19 and/or tapering of the section of the diaphragm assist in producing this action but the present invention by producing an elastic stress tending to bend this part of the diaphragm upwards, also assists in inverting the diaphragm from the periphery inwards. To this extent the ribs or tapering section have less to do and can therefore be made of lighter section, this also contributing to increasing the flexibility of the diaphragm and reducing the effort necessary to invert it.

I claim:

1. A diaphragm valve comprising a body having a bore with inlet and outlet portions and an intermediate seating chamber and with walls of said portions and chamber on one side of the bore being in substantial alignment, a seating in said body in said intermediate seating chamber comprising a first seating section formed by an arcuate peripheral bore surface portion at said side of said bore, said body being formed with an enlargement having a lateral opening opposing said first seating section and having a clamping surface around the mouth thereof, the enlargement including a second seating section formed by a surface tapering inwardly from said lateral opening toward said first seating section and at the ends of said first seating section merging substantially tangentially therewith, a bonnet over said lateral opening secured to said body, a flexible diaphragm having its margin sealingly clamped between said bonnet and said body clamping surface and molded with its central portion extending toward said first seating section, said margin having a surface adjacent said body clamping surface which converges therewith toward the mouth of the opening prior to clamping so that this diaphragm margin is placed under tension on the side away from the valve bore and under compression on the side towards the valve bore after clamping, and valve operating means carried by said bonnet and including an actuator associated with said diaphragm to move the latter into and out of sealing and seating engagement with said first and second seating sections.

2. A diaphragm valve of the type having a body with a substantially straight through passageway and free of any substantial obstructions, an opening in the side thereof and a clamping flange around said opening and a bonnet covering said body opening with a clamping flange presented toward said body flange, a cone-shaped diaphragm covering said body opening and comprising a central conical bulge extending into the body and terminating in a rounded part which when the valve is closed engages the passageway opposite thereto and having peripheral portions extending between said body and bonnet flanges to be clamped therebetween, said diaphragm being preformed with said peripheral portions having surfaces adjacent said body clamping surface which converge therewith toward the opening prior to said clamping, whereby when clamped the outer side of the diaphragm is stressed in tension and the inner side of the diaphragm is stressed in compression.

References Cited in the file of this patent

UNITED STATES PATENTS

| 1,266,324 | Schacht | May 14, 1918 |
| 2,605,991 | Kaye | Aug. 5, 1952 |
| 2,705,124 | Price et al. | Mar. 29, 1955 |

FOREIGN PATENTS

| 541,828 | Great Britain | of 1941 |
| 257,508 | Switzerland | Apr. 1, 1948 |
| 657,324 | Great Britain | of 1951 |
| 685,935 | Great Britain | Jan. 14, 1953 |